Patented June 29, 1948

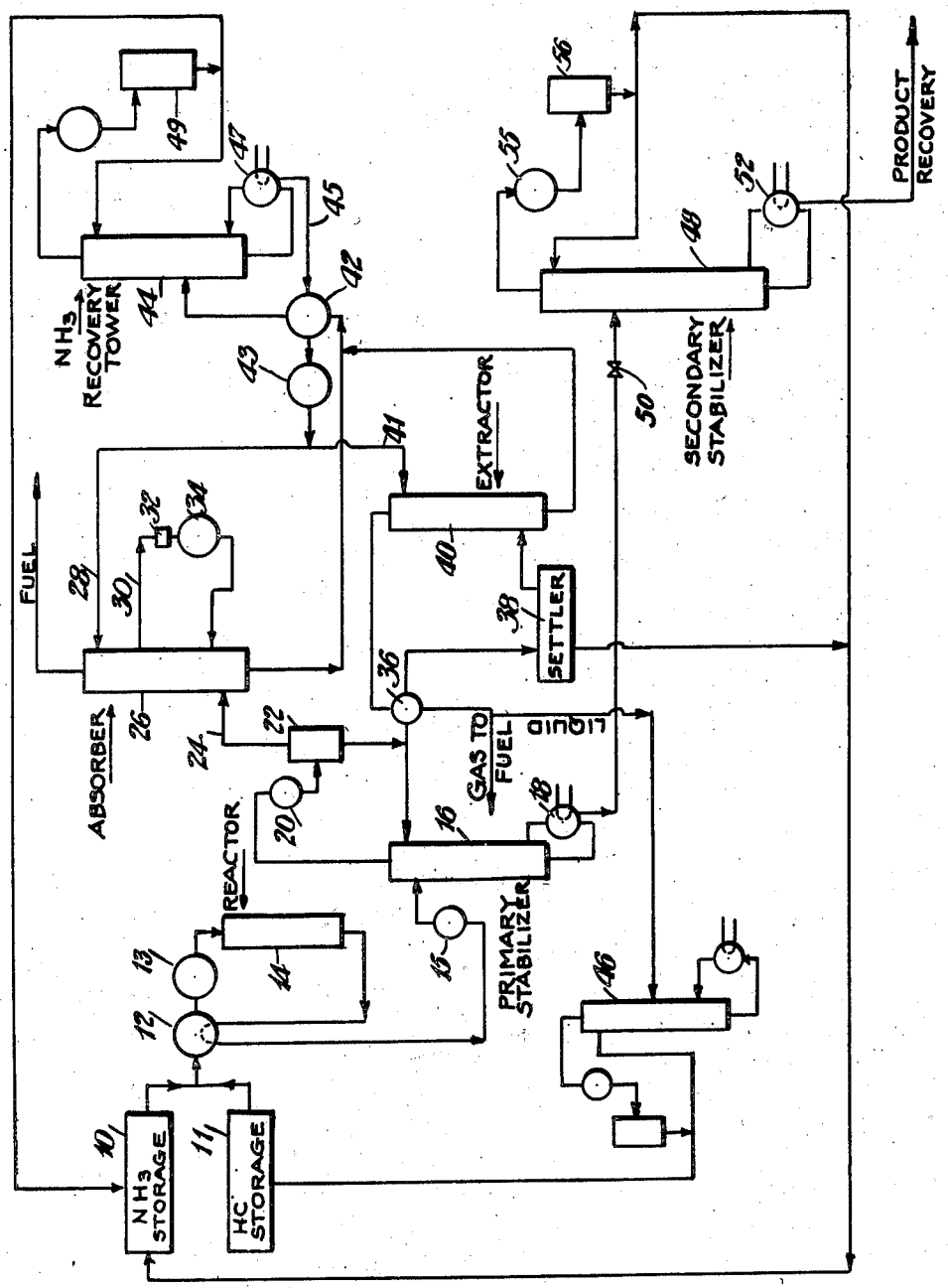

2,444,175

UNITED STATES PATENT OFFICE 2,444,175

SEPARATION OF AMMONIA AND HYDRO-
CARBONS FROM MIXTURES CONTAINING
AMMONIA, PROPANE, PROPYLENE, AND
HIGHER BOILING MATERIALS

John W. Teter, Chicago, Ill., and Reading Barlow
Smith, Hammond, Ind., assignors to Sinclair
Refining Company, New York, N. Y., a corporation of Maine Application October 12, 1944, Serial No. 558,485

3 Claims. (Cl. 202—40)

This invention relates generically to the separation of ammonia from mixtures containing ammonia, hydrocarbons, and other materials such as nitriles and the like, and specifically to the recovery of unreacted ammonia for recycling in the direct amination of olefins with ammonia with the use of a catalyst at elevated temperatures, particularly mixtures containing propylene and propane, which usually contain some $C_2$ hydrocarbons and lighter products.

The direct amination of such olefins as ethylene and propylene with ammonia at high temperatures and pressures with the use of a suitable catalyst is known. See, for example, applications Serial Nos. 289,186, filed August 9, 1939 (now abandoned), and 464,636, filed November 5, 1942, now Patent No. 2,381,709.

If propylene is the olefin present in predominating quantity, the major products of the reaction are acetonitrile, propionitrile, butyronitriles, and isopropylamine. Other products containing nitrogen are also produced. In addition, as the result of the reactions which take place, the effluent from the reactor contains hydrogen, hydrocarbons ranging from methane through heavy hydrocarbons, unreacted olefins, unreacted ammonia and such hydrocarbons inert to the amination reaction as were originally introduced and were not cracked or otherwise modified in the process. With other olefins, such as the heavier olefins, other hydrocarbons than propane and propylene will be present in substantial quantities, but, through cracking or the like, there will nevertheless usually be present substantial amounts of light hydrocarbons boiling near ammonia.

The reaction proceeds efficiently, from the standpoint of product yield, and catalyst life, only if the amount of olefin in the feed is relatively small, around 10 to 20 mol percent. Good yields are favored by the use of an excess of ammonia, for example, from 5 to 10 mols of ammonia or even more, for each mol of olefin.

Ordinarily, therefore, best results are obtained in the direct amination procedure through the use of a feed which consists of olefins in admixture with saturated hydrocarbons, for example, a mixture of propane and propylene with minor quantities of other hydrocarbons, the proportions of propane and propylene ranging around 1 to 1 with a substantial excess of ammonia, for example, from 5 to 10 mols of ammonia for each mol of olefin. The reaction product therefore contains a large amount of unreacted ammonia, of inert hydrocarbon, of unreacted olefin, of a rather diverse mixture of nitrogen-containing products, and of products resulting from cracking, including hydrogen. Separation of the ammonia for recycling from this mixture is necessary, because of the relatively small proportion of the ammonia which reacts in a single pass through the reactor. The present invention provides for the substantially complete recovery of unreacted ammonia economically.

In accordance with the present invention, the products from the reaction vessel are supplied to a stabilizer, operated at temperatures and pressures designed to take overhead much of the ammonia, most of the propane and propylene, and substantially all of the lighter gases in the reaction mixture. The overhead from this stabilizer is cooled, and the propylene-propane-ammonia portion condensed, a portion being returned as reflux and the remainder introduced into apparatus which provides for the separation of the ammonia from the hydrocarbon by settling, centrifuging or the like, taking advantage of the fact that at certain low temperatures, the ammonia and hydrocarbon have low mutual solubilities. See application Serial No. 470,450, filed December 29, 1942. From this separator are taken two portions, one consisting of hydrocarbon containing a small amount of ammonia and the other of ammonia containing a small amount of hydrocarbon. The separated ammonia is returned for recycling through the amination reactors, the small amount of hydrocarbon which it contains, being largely propane and propylene, in no way interfering with its use but serving at least where propylene is the olefin to be aminated, to supplement the hydrocarbon feed to the reactor. The separated hydrocarbon fraction, containing some ammonia, is supplied to a countercurrent extractor in which the ammonia which it contains is washed out through countercurrent contact with water.

The light gases in the stabilizer overhead, which are not condensed, contain a considerable amount of ammonia, and these are led to an ammonia absorber, in which they are washed with water, which absorbs the ammonia, the stripped gases then being used for fuel or other purposes. The aqueous ammonia from both the extractor and the absorber is supplied to an ammonia recovery tower, in which the ammonia is distilled from the water, and taken as an overhead product, the water from which the ammonia, or most of it, has been removed being taken as a bottoms product and advantageously returned to the absorber and the extractor. The overhead from this recovery tower is condensed and returned for supply to the amination reactors. In some cases it is desirable to dry it before supplying it to the reactors, and in that case it may be passed through a conventional water absorber.

The bottoms from the stabilizer, which still contain a large portion, if not the major portion, of the ammonia present in the reaction mixture, are supplied to a second stabilizing column, operated under temperature and pressure conditions designed to take overhead substantially all of the ammonia, together with substantially all of the propane and propylene which remain in the product from the first stabilizer. The overhead from this stabilizer is condensed, a portion being returned as reflux, and the remainder being supplied as recycle ammonia for reuse in the process. Normally, this liquefied product will contain some propane and some propylene, but as pointed out above, this does not interfere with the use of the ammonia in the amination reaction, as it supplements the ordinary hydrocarbon feed.

The invention as applied to the amination of propylene will be further illustrated in connection with the appended drawing which shows, in diagrammatic fashion, apparatus in which the process may be practiced.

With the use of the apparatus illustrated in the drawing, ammonia and hydrocarbon are supplied from the sources 10 and 11 to the reactor 14, after being suitably preheated in the heat exchanger 12 and the preheater 13 and compressed. Thus they may be supplied to the reactor at a pressure of 1500 to 3000 pounds per square inch and at a temperature of around 640° F. A suitable hydrocarbon feed is a standard PP fraction from cracking sources, containing, for example, about 2% of methane, 3% of ethylene, 13% of ethane, 32% of propylene, 49% of propane, 1% of isobutane and negligible proportions of higher hydrocarbons. Such a mixture may be used with about one and one-half times its weight of ammonia. A small amount of water is advantageously supplied also, in accordance with the invention of John W. Teter, described in application Serial No. 558,486, filed October 12, 1944, now Patent No. 2,417,893.

The product from the reactor will contain somewhat more propane and ethane than the original feed, a good deal less propylene, almost no ethylene and some methane and hydrogen. In addition, it will contain a substantial proportion of nitrogen-containing products including various nitriles, isopropylamine, complex products such as higher hydrocarbons and cyclic nitrogen compounds and 90% or more of the ammonia originally introduced. The product is passed through the heat exchanger 12 and then is cooled to around 130° F. in the cooler 15 and introduced into the stabilizer 16, maintained at about 550 pounds per square inch pressure. The bottom temperature, maintained by the reboiler 18, is 165° F. The overhead is cooled to 100° F. in the condenser 20, and fed to the accumulator 22, in which most of the ammonia, propane and propylene in the overhead condense, the lighter gases passing up through the vapor line 24. These lighter gases, of course, carry with them some ammonia and propane and propylene.

The gases are fed to the bottom of the ammonia absorber 26 through which they rise in countercurrent contact with water fed to the absorber by the line 28. This absorber may be operated at a pressure of 300 pounds per square inch, with a top temperature of 100° F. and a bottom temperature of 250° F., temperature control being obtained by circulating a cooling medium within the tower by the circulating line 30, pump 32, and cooler 34. The overhead from this absorber, which consists of light hydrocarbon gases and hydrogen is used for fuel or other purposes.

The condensate in the accumulator 22 is partly returned as reflux to the stabilizer 16, and the remainder is cooled, as in the cooler 36 to a temperature below about 74° F., advantageously to 35° F., and then is fed to the settling tank 38 in which the mixture stratifies into two layers, the lower consisting of ammonia containing a little hydrocarbon and the upper consisting of the hydrocarbon containing a little ammonia. The lower layer is drawn off and returned to the ammonia storage for reuse in the process. The upper layer is supplied to the extractor 40, a vertical packed tower in which it is brought into countercurrent contact with water introduced through the line 41 at the top of the tower. This tower may be operated at around 407 pounds per square inch. With introduction of the hydrocarbon at 35°, its temperature when removed from the settler 38, and the water at around 100°, the effluent temperatures will be around 85° at the top and 80° at the bottom. About 1 pound of water will be required for each 4½ pounds of hydrocarbon for efficient removal of the ammonia from the hydrocarbon, although, of course, more or less may be used and the quantity will depend upon the design of the tower, the efficiency of the settler 38 and other factors. The overhead from the extractor, consisting of liquid, normally gaseous hydrocarbons under pressure, may be used for any desired purpose. Advantageously, some will be expanded and used for cooling the cooler 36 as illustrated, to reduce the temperature of the ammonia-hydrocarbon mixture from the accumulator 22 to a temperature low enough to provide efficient separation, the liquid then being supplied to the fractionating column 46, for separation of a portion of the propane it contains, the propylene-enriched hydrocarbon so obtained being recycled to the amination reactor and the gas being used for fuel or the like. The bottoms from the extractor 40, consisting of dilute aqueous ammonia, and the bottoms from the absorber 26, also consisting of dilute aqueous ammonia are combined, preheated in the heater 42, and supplied to the ammonia recovery tower 44. The combined stream may be supplied to this tower at a pressure of around 285 pounds per square inch and a temperature of about 293° F. The tower is a vertical packed tower. The bottom of the tower is maintained at a temperature of around 413° F. by the reboiler 47, and the draw-off through the line 45 at the bottom consists of water, which is advantageously used to preheat the feed to the recovery tower in the preheater 42, and is then further cooled in the cooler 43 and used as the water supply to the ammonia absorber and the ammonia extractor.

The overhead from the tower 44 is cooled and condensed and collected in the accumulator 49, a portion being returned to the tower as reflux and the remainder being returned to the ammonia storage for reuse in the process.

The bottoms from the stabilizer 16 are supplied to a second stabilizer 48 which serves to remove from the product the rest of the ammonia, propane and propylene which it contains. The stabilizer may be operated at around 229 pounds per square inch, with the feed at a temperature of 105° F. obtained by releasing the primary stabilizer bottoms through the expansion valve 50. The bottom temperature is maintained at 415° F. by the reboiler 52. The overhead is condensed in the condenser 55 and collected in the accumulator 56, a portion being returned as reflux and the remainder being returned to ammonia storage for reuse in the process. The ammonia collected here may constitute around two-thirds of the total ammonia recovered, and may contain about 1 to 5% of hydrocarbon, mainly propylene and propane. The bottoms from this stabilizer are treated to recover the products contained therein.

Following the procedure outlined in this illustration of the invention, something less than one-third of the ammonia will be recovered from the settler 38, about two-thirds in the accumulator 56, and 7 or 8% in the accumulator 46. A typical material balance for operation as described is shown in the following table, in which proportions are given in units of weight for a given period of time, with the use of two reactors in parallel so that the operation is substantially continuous, with one reactor on stream while the other is being treated to reactivate the catalyst, both feeding to the same ammonia recovery system:

1. Amination reactors 14

| Component | From Fresh HC Supply | From Fresh NH$_3$ Supply | NH$_3$ Recycle | H$_2$O | HC Recycle | To Primary Stabilizer 16 |
|---|---|---|---|---|---|---|
| H$_2$ | | | | | | 114 |
| C$_1$ | 486 | | 21 | | 83 | 963 |
| —C$_2$ | 758 | | 11 | | 133 | 409 |
| C$_2$ | 3,220 | | 162 | | 2,179 | 5,739 |
| —C$_3$ | 7,550 | | 460 | | 7,690 | 13,100 |
| C$_3$ | 11,607 | | 1,023 | | 11,506 | 24,363 |
| iC$_4$ | 290 | | 32 | | | 322 |
| nC$_4$ | 16 | | 40 | | | 327 |
| Poly C$_6$ | | | | | | 25 |
| iC$_3$NH$_2$ | | | | | | 169 |
| Poly C$_8$ | | | | | | 44 |
| C$_2$—N | | | | | | 659 |
| C$_3$—N | | | | | | 1,283 |
| iC$_4$—N | | | | | | 88 |
| nC$_4$—N | | | | | | 353 |
| C$_6$—N | | | | | | 119 |
| Pyridines | | | | | | 29 |
| Tar | | | | | | 32 |
| NH$_3$ | | 912 | 67,232 | | 10 | 67,283 |
| H$_2$O | | | 9 | 139 | | 148 |
| Total | 23,927 | 912 | 68,990 | 139 | 21,601 | 115,569 |

2. Primary stabilizer 16

| Component | From Reactors | Bottoms To Sec. Stabilizer | To NH$_3$ Absorber 26 | To Settler 38 |
|---|---|---|---|---|
| H$_2$ | 114 | | 114 | |
| C$_1$ | 963 | | 236 | 727 |
| —C$_2$ | 409 | | 28 | 381 |
| C$_2$ | 5,739 | | 298 | 5,441 |
| —C$_3$ | 13,100 | 100 | 627 | 12,373 |
| C$_3$ | 24,363 | 335 | 1,080 | 22,948 |
| iC$_4$ | 322 | 20 | 3 | 299 |
| nC$_4$ | 327 | 28 | 2 | 297 |
| Poly C$_6$ | 25 | 25 | | |
| iC$_3$NH$_2$ | 169 | 169 | | |
| Poly C$_8$ | 44 | 44 | | |
| C$_2$—N | 659 | 659 | | |
| C$_3$—N | 1,283 | 1,283 | | |
| iC$_4$—N | 88 | 88 | | |
| nC$_4$—N | 353 | 353 | | |
| C$_6$—N | 119 | 119 | | |
| Pyridines | 29 | 29 | | |
| Tar | 32 | 32 | | |
| NH$_3$ | 67,283 | 43,441 | 550 | 23,292 |
| H$_2$O | 148 | 148 | | |
| Total | 115,569 | 46,873 | 2,938 | 65,758 |

3. Secondary stabilizer 48

| Component | From Primary Stabilizer 16 | Bottoms | Overhead |
|---|---|---|---|
| —C$_2$ | 100 | | 100 |
| C$_2$ | 335 | | 335 |
| iC$_4$ | 20 | | 20 |
| nC$_4$ | 28 | | 28 |
| Poly C$_6$ | 25 | 25 | |
| iC$_3$NH$_2$ | 169 | 169 | |
| Poly C$_8$ | 44 | 44 | |
| C$_2$—N | 659 | 659 | |
| C$_3$—N | 1,283 | 1,283 | |
| iC$_4$—N | 88 | 88 | |
| nC$_4$—N | 353 | 353 | |
| C$_6$—N | 119 | 119 | |
| Pyridines | 29 | 29 | |
| Tar | 32 | 32 | |
| NH$_3$ | 43,441 | 10 | 43,431 |
| H$_2$O | 148 | 148 | |
| Total | 46,873 | 2,959 | 43,914 |

4. Settler 38

| Component | From Primary Stabilizer 16 | NH$_3$ Layer To NH$_3$ Storage | HC Layer To Extractor 40 |
|---|---|---|---|
| C$_1$ | 727 | 21 | 706 |
| —C$_2$ | 381 | 11 | 370 |
| C$_2$ | 5,441 | 153 | 5,288 |
| —C$_3$ | 12,373 | 348 | 12,025 |
| C$_3$ | 22,948 | 646 | 22,302 |
| iC$_4$ | 299 | 12 | 287 |
| nC$_4$ | 297 | 12 | 285 |
| NH$_3$ | 23,292 | 18,706 | 4,586 |
| Total | 65,758 | 19,909 | 45,849 |

5. Ammonia absorber 26

| Component | From Primary Stabilizer 16 | From NH$_3$ Recovery Tower 44 | Bottoms To NH$_3$ Recovery Tower 44 | Overhead To Fuel |
|---|---|---|---|---|
| H$_2$ | 114 | | | 114 |
| C$_1$ | 236 | | | 236 |
| —C$_2$ | 28 | | | 28 |
| C$_2$ | 298 | | | 298 |
| —C$_3$ | 627 | | | 627 |
| C$_3$ | 1,080 | | | 1,080 |
| iC$_4$ | 3 | | | 3 |
| nC$_4$ | 2 | | | 2 |
| NH$_3$ | 550 | 58 | 608 | |
| H$_2$O | | 5,888 | 5,888 | |
| Total | 2,938 | 5,946 | 6,496 | 2,388 |

6. Ammonia extractor 40

| Component | From Settler 38 | From NH$_3$ Recovery Tower 44 | To NH$_3$ Recovery Tower 44 | Overhead To Cooler 36 |
|---|---|---|---|---|
| C$_1$ | 706 | | | 706 |
| —C$_2$ | 370 | | | 370 |
| C$_2$ | 5,288 | | 9 | 5,279 |
| —C$_3$ | 12,025 | | 12 | 12,013 |
| C$_3$ | 22,302 | | 42 | 22,260 |
| iC$_4$ | 287 | | | 287 |
| nC$_4$ | 285 | | | 285 |
| NH$_3$ | 4,586 | 109 | 4,654 | 41 |
| H$_2$O | | ¹10,759 | 10,759 | |
| Total | 45,849 | 10,868 | 15,476 | 41,241 |

¹ Includes 9# make-up water.

7. Cooler 36

| Component | From NH$_3$ Extractor 40 | Liquid to Column 46 | Gas to Fuel |
|---|---|---|---|
| C$_1$ | 706 | 83 | 623 |
| —C$_2$ | 370 | 133 | 237 |
| C$_2$ | 5,279 | 2,179 | 3,100 |
| —C$_3$ | 12,013 | 8,275 | 3,738 |
| C$_3$ | 22,260 | 16,064 | 6,196 |
| iC$_4$ | 287 | 244 | 43 |
| nC$_4$ | 285 | 255 | 30 |
| NH$_3$ | 41 | 10 | 31 |
| Total | 41,241 | 27,243 | 13,998 |

8. Fractionating column 46

| Component | From Cooler 36 | Bottoms To Fuel | Overhead Recycle HC |
|---|---|---|---|
| $C_1$ | 83 | | 83 |
| $-C_2$ | 133 | | 133 |
| $C_2$ | 2,179 | | 2,179 |
| $-C_3$ | 8,275 | 585 | 7,690 |
| $C_3$ | 16,064 | 4,558 | 11,506 |
| $iC_4$ | 244 | 244 | |
| $nC_4$ | 255 | 255 | |
| $NH_3$ | 10 | | 10 |
| Total | 27,243 | 5,642 | 21,601 |

9. Ammonia recovery tower 44

| Component | From $NH_3$ Absorber 28 | From $NH_3$ Extractor 40 | To $NH_3$ Absorber 26 | To $NH_3$ Extractor 40 | To $NH_3$ Storage |
|---|---|---|---|---|---|
| $C_2$ | | 9 | | | 9 |
| $C_3$ | | 12 | | | 12 |
| $C_3$ | | 42 | | | 42 |
| $NH_3$ | 608 | 4,654 | 58 | 109 | 5,095 |
| $H_2O$ | 5,888 | 10,759 | 5,888 | 10,750 | 9 |
| Total | 6,496 | 15,476 | 5,946 | 10,859 | 5,167 |

In the foregoing material balances the products identified by symbols other than by name or by their complete chemical formula are as follows:

$C_1$, methane; $-C_2$, ethylene; $C_2$, ethane; $-C_3$, propane; $iC_4$, isobutane; $nC_4$, normal butane; poly $C_6$, polymerized hydrocarbons containing 6 carbon atoms per molecule; $iC_3NH_2$, isopropylamine; poly $C_8$, polymerized hydrocarbons containing 8 carbon atoms per molecule; $C_2-N$, acetonitrile; $C_3-N$, propionitrile; $iC_4-N$, isobutyronitrile; $nC_4-N$, butyronitrile; $C_8-N$, caprylonitrile.

We claim:

1. In a method of separating ammonia and hydrocarbons from mixtures containing ammonia, propane, propylene and higher boiling materials, the improvement which comprises fractionally distilling the mixture to separate an overhead fraction containing a portion of the ammonia and most of the propane and propylene and a bottoms fraction containing the rest of the ammonia, subjecting said bottoms fraction to a second distillation to separate an overhead fraction containing substantially all of the remaining ammonia with a relatively small proportion of hydrocarbon, and recovering ammonia from the overhead fraction of said first distillation operation.

2. The combination of steps as in claim 1 in which the overhead from the first distillation is subjected to fractional condensation, to produce a liquid fraction containing some hydrocarbon and most of the ammonia in said overhead fraction, separately recovering ammonia from said liquefied fraction and from said unliquefied fraction.

3. The combination of steps as in claim 1 in which the overhead from said first fractional distillation is subjected to fractional condensation, giving a liquid fraction containing most of the ammonia and some hydrocarbon and a vapor phase fraction containing some ammonia, subjecting said vapor phase fraction to countercurrent washing with water, subjecting said liquid fraction to stratification and separating therefrom an ammonia fraction and a hydrocarbon fraction containing a small quantity of ammonia, subjecting said last-named fraction to countercurrent extraction with water, and recovering the ammonia from the two resulting aqueous extracts.

JOHN W. TETER.
READING BARLOW SMITH.

REFERENCES CITED

The following references are of record in the file of this patent:

UNITED STATES PATENTS

| Number | Name | Date |
|---|---|---|
| 1,866,800 | Deanesly | July 12, 1932 |
| 1,973,474 | Eglott | Sept. 11, 1934 |
| 2,080,064 | Roelfsema | May 11, 1937 |
| 2,370,063 | Nutting et al. | Feb. 20, 1945 |
| 2,395,057 | Marsh | Feb. 19, 1946 |

FOREIGN PATENTS

| Number | Country | Date |
|---|---|---|
| 422,139 | Great Britain | Jan. 7, 1935 |